(12) United States Patent
Willinger et al.

(10) Patent No.: US 6,651,590 B2
(45) Date of Patent: Nov. 25, 2003

(54) FLEXIBLE TOY

(75) Inventors: Jonathan Willinger, Tenafly, NJ (US); Karen O. Winkler, Bethlehem, PA (US)

(73) Assignee: JW Pet Company, Hasbrouck Heights, NJ (US)

( * ) Notice: Subject to any disclaimer, the term of this patent is extended or adjusted under 35 U.S.C. 154(b) by 0 days.

(21) Appl. No.: 10/047,490

(22) Filed: Jan. 14, 2002

(65) Prior Publication Data

US 2003/0131803 A1 Jul. 17, 2003

Related U.S. Application Data

(63) Continuation of application No. 10/047,981, filed on Oct. 23, 2001, which is a continuation of application No. 09/847,564, filed on May 2, 2001, now abandoned.
(60) Provisional application No. 60/265,197, filed on Jan. 31, 2001.

(51) Int. Cl.$^7$ .............................................. A01K 29/00
(52) U.S. Cl. ........................ 119/707; 119/702; 119/709; 446/431
(58) Field of Search ................ 119/702, 707, 119/708, 709, 710, 711; D30/160; 446/431, 409; 425/28.1

(56) References Cited

U.S. PATENT DOCUMENTS

| | | | |
|---|---|---|---|
| D80,740 S | | 3/1930 | Perry |
| D219,284 S | | 11/1970 | Hunt |
| 3,633,587 A | * | 1/1972 | Hunt ............................ 446/409 |
| 3,889,950 A | | 6/1975 | Kasravi |
| 4,248,424 A | * | 2/1981 | Judkins ................ 273/DIG. 20 |
| 4,302,901 A | * | 12/1981 | Psyras ............................ 446/46 |
| D332,982 S | | 2/1993 | Norman et al. |
| 5,207,420 A | * | 5/1993 | Crawford et al. ............ 119/707 |
| 5,224,959 A | | 7/1993 | Kasper |
| 5,236,196 A | | 8/1993 | Blankenburg et al. |
| 5,269,526 A | * | 12/1993 | Wollstein ..................... 473/159 |
| D359,327 S | | 6/1995 | Gould |
| 5,807,192 A | * | 9/1998 | Yamagishi et al. .. 273/DIG. 20 |
| D411,335 S | * | 6/1999 | Hester .......................... D28/67 |
| 5,941,197 A | * | 8/1999 | Axelrod ....................... 119/710 |
| 6,003,470 A | * | 12/1999 | Budman ...................... 119/711 |
| 6,142,886 A | * | 11/2000 | Sullivan et al. ...... 273/DIG. 20 |
| 6,186,095 B1 | * | 2/2001 | Simon .......................... 119/707 |
| 6,190,269 B1 | * | 2/2001 | Moriyama ................... 473/373 |
| 6,200,616 B1 | * | 3/2001 | Axelrod et al. ............. 426/285 |
| 6,403,003 B1 | * | 6/2002 | Fekete et al. ................ 264/129 |

OTHER PUBLICATIONS

Printout from http://www.sportime.com/products/grabb-ball.shtml on Jan. 2, 2002 by Applicant, illustrating the Grabball™ product from Sportime LLC.*

Printout from http://www.sportime.com/products/grab-ball.shtml on Jan. 2, 2002, illustrating the Grabball™ product from Sportime LLC, along with two photographs taken by the Applicant showing the Grabball product and a closeup of the Grabball product as compared with the Applicant;s product.

Printout from http://www.oakwood.edu/chemistry/bucky-ball.html on Jan. 2, 2002 with Buckyball illustration.

* cited by examiner

*Primary Examiner*—Yvonne Abbott
(74) *Attorney, Agent, or Firm*—Katten Muchin Zavis Rosenman

(57) ABSTRACT

Skeletal animal toys capable of rolling and bouncing comprise polyhedra or other skeletal structures which can be inscribed on an imaginary spherical or ellipsoidal surface, tori and linear members which form a cylinder with circular cross-section, or elliptical and linear members which form a cylinder with elliptical cross-section. The skeletal animal toy is formed of an elastomeric material, which is preferably natural rubber, synthetic natural rubber, or a blend of natural rubber or synthetic natural rubber and one of a plurality of blending polymers including butadiene rubber, styrene-butadiene rubber, nitrile rubber and ethylene-propylene-diene-monomer rubber.

30 Claims, 18 Drawing Sheets

FLEXIBLE TOY

CROSS-REFERENCE TO RELATED APPLICATION

This is a continuation of U.S. application Ser. No. 10/047,981 filed Oct. 23, 2001, which is a continuation of U.S. application Ser. No. 09/847,564, filed May 2, 2001 now abandoned, which claimed the benefit under 35 U.S.C. §119(e) of U.S. Provisional Application No. 60/265,197, filed on Jan. 31, 2001.

BACKGROUND OF THE INVENTION

1. Field of the Invention

This invention relates to the field of animal toys and more specifically, to hollow rollable animal toys.

2. Description of the Related Art

Although many animal toys exist in various shapes and sizes, it is particularly desirable to produce animal toys having a skeletal structure of unitary, one-piece construction that are able to roll and bounce. The skeletal structure of the toy allows the animal to grasp the toy with its teeth and substantially lightens the toy, while the capability of rolling and bouncing increases the attractiveness of the toy to the animal. The capability of rolling dictates that the skeletal structure form a sphere, a cylinder, or a shape that is substantially spherical, cylindrical or otherwise rounded in some fashion. The requirement that the toy bounce indicates that it must be made of some elastomeric material. If however, the unitary construction is to be made spherical in nature or even in the form of a cylinder, the problem presents itself of extracting the one-piece mold on which the skeletal structure is formed from the inside of the skeletal structure after the skeletal structure is formed.

SUMMARY OF THE INVENTION

The present invention comprises a substantially spherical or cylindrical skeletal structure of unitary construction made of natural rubber, which is capable of rolling and bouncing. Natural rubber is preferred for the one-piece skeletal structure since it will stretch enough when hot and newly formed to allow the internal mold to be pulled out of the skeletal structure, in contrast with synthetic elastomers which may not have the requisite elasticity to allow extraction of the internal mold after forming of the unitary structure. Focusing on the extraction of the internal mold from the skeletal structure is important since the skeletal structure is of a unitary construction, and such extraction must be performed without damaging the integrity of the structure. Furthermore, natural rubber has superior tear resistance when compared to the tear resistance of synthetic elastomers, which is important in an animal toy likely to be grasped with an animal's teeth.

The holes in the skeletal structure must be of sufficient size to allow the mold to be extracted from the skeletal structure after forming on that mold, so that the extraction does not breach the integrity of the structure, yet the holes must not be so large to interfere with the rolling capability of the skeletal structure. The elastomeric quality of the natural rubber used for the skeletal structure will also allow compression of the skeletal structure during shipment to enable more skeletal structures to be packed into a smaller space than would otherwise be possible.

DETAILED DESCRIPTION OF THE PREFERRED EMBODIMENT

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Figure 1:
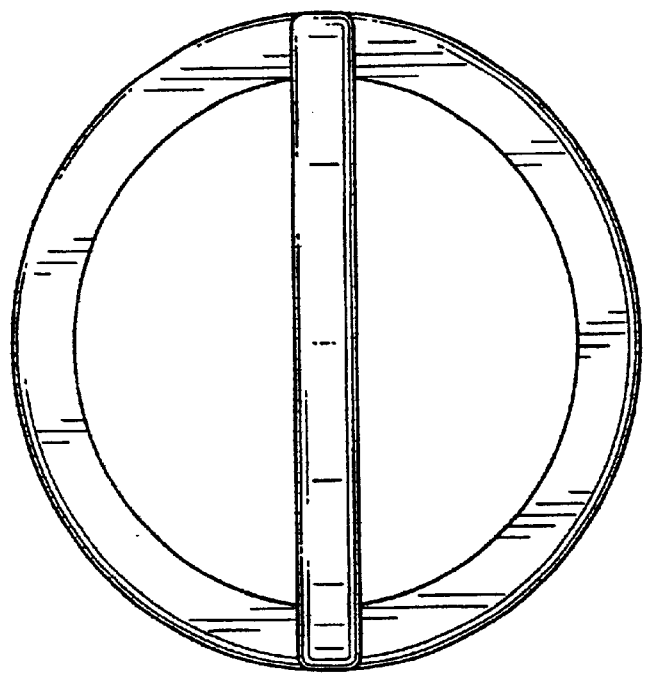
FIG. 1 is a plan view of the first embodiment of the invention.
Figure 2:
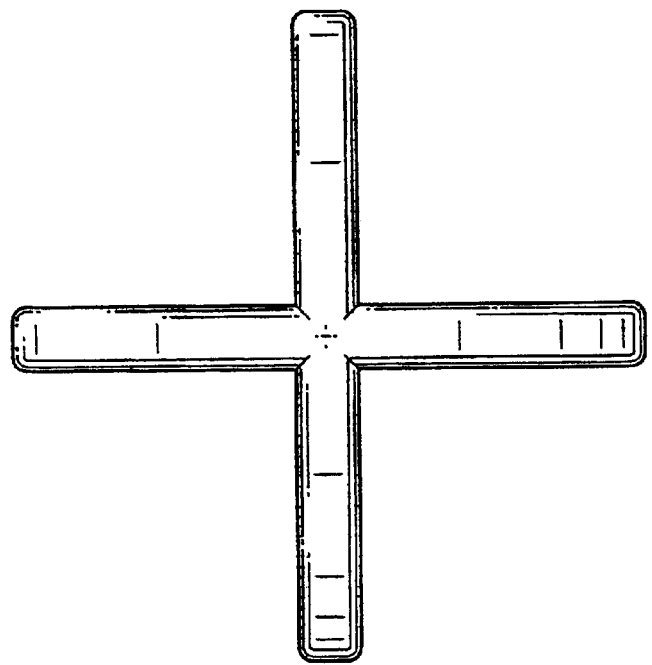
FIG. 2 is an elevation view for the first embodiment of the invention.
Figure 3:
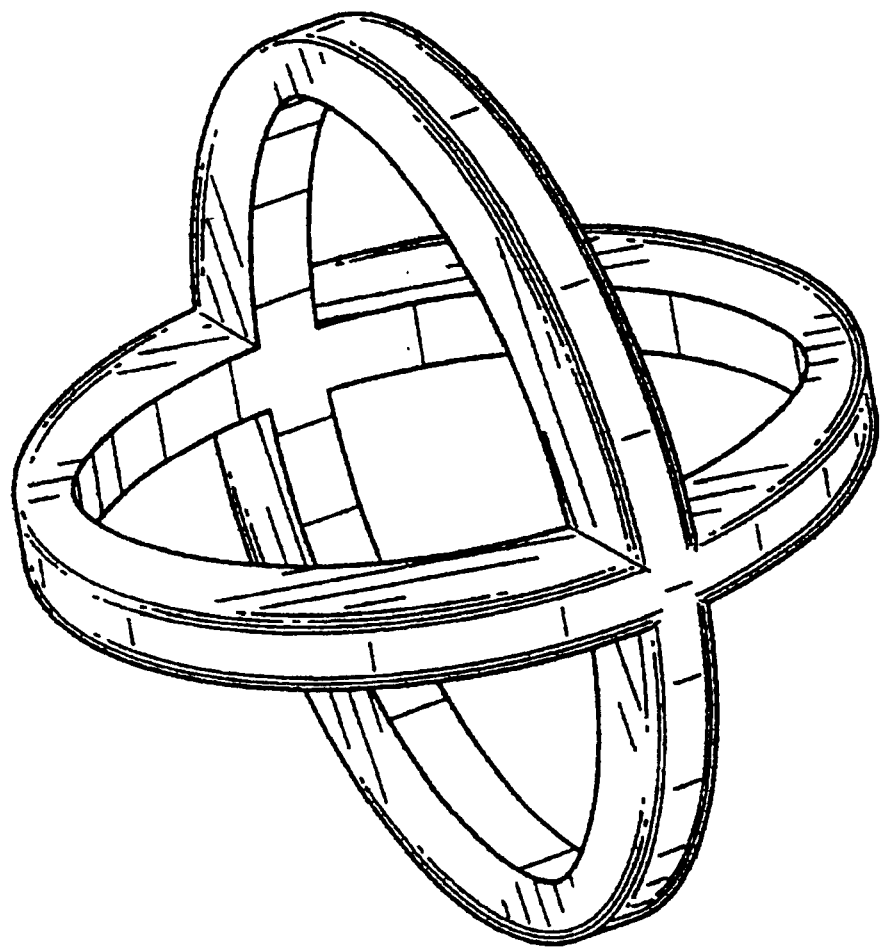
FIG. 3 is a perspective view of the first embodiment of the invention.

FIGS. 1, 2, and 3 show views of the first embodiment of the invention. The first embodiment of the invention comprises a unitary construction defined by two tori of natural rubber attached to each other at right angles. The tori are of equal diameter, which can be enclosed within a spherical surface of equal diameter. The proportion of the area of such a spherical surface occupied by the spaces between the tori, however, may impede easy rolling of the animal toy.

Figure 4:
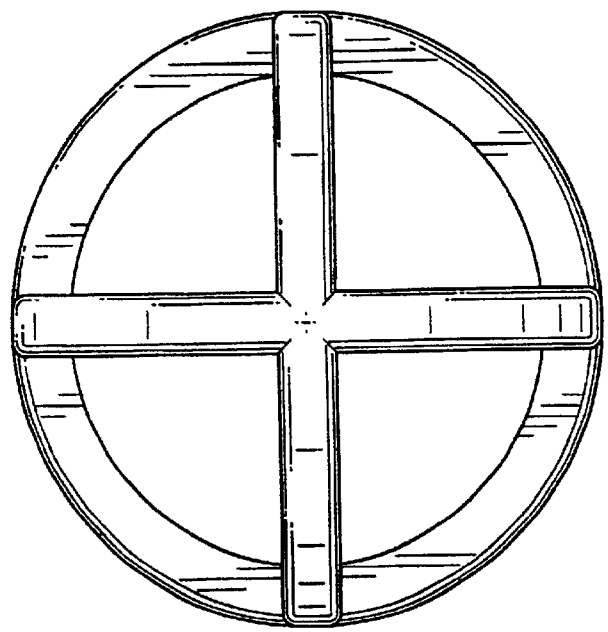
FIG. 4 is a plan view of a second embodiment of the invention, an elevation view of a second embodiment of the invention being identical to the plan view.
Figure 5:
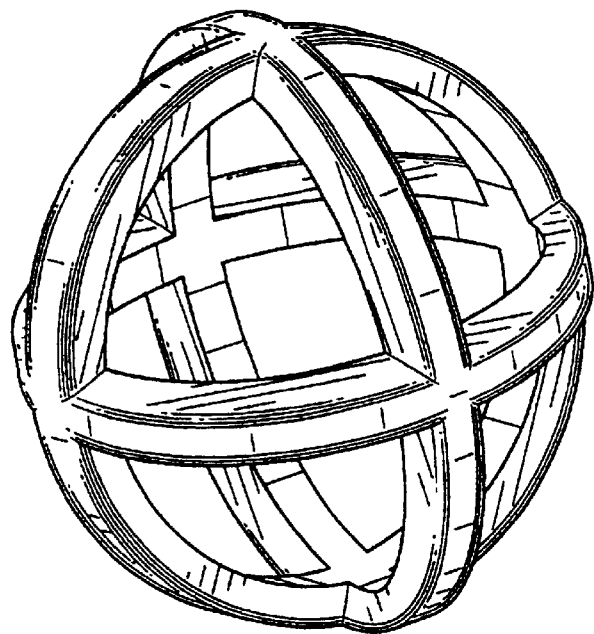
FIG. 5 is a perspective view of the second embodiment of the invention.

The second embodiment of the invention, shown in FIGS. 4 and 5, differs from the first embodiment of the invention in that it adds yet a third torus set at right angles to both the first and second tori. Such second embodiment, as preferably with all embodiments of the present invention as evidenced by the figures, also comprises a unitary construction. All three tori are of equal diameter, and can be enclosed within a spherical surface of equal diameter. The total area of the spaces between adjacent tori is a smaller proportion of the surface area of the spherical surface within which the tori can be enclosed than the analogous proportion for the total area of the spaces between the tori of the first embodiment of the invention. Thus, the second embodiment of the invention should roll more easily than the first embodiment of the invention.

Figure 6:
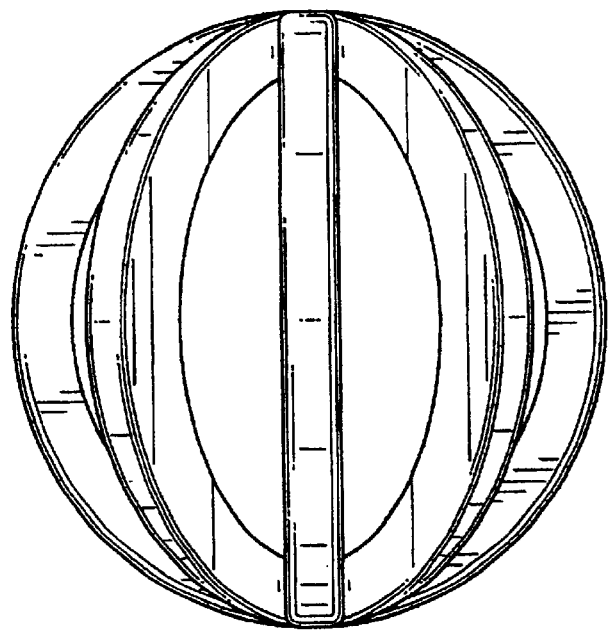
FIG. 6 is an elevation view of a third embodiment of the invention.
Figure 7:
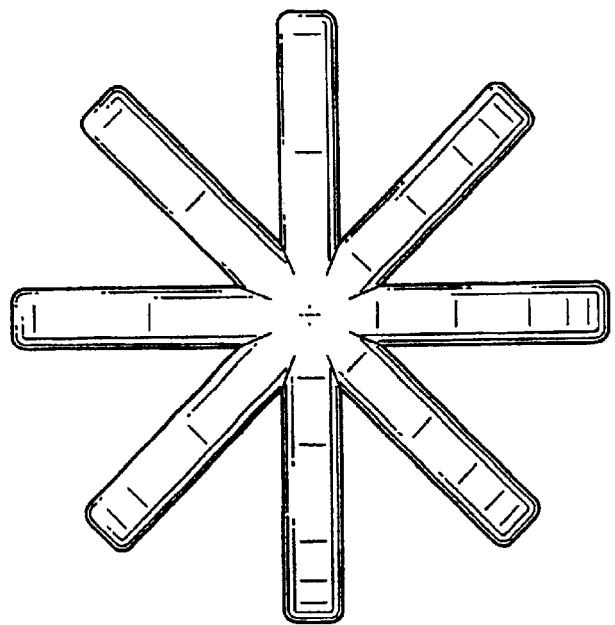
FIG. 7 is a plan view of the third embodiment of the invention.
Figure 8:
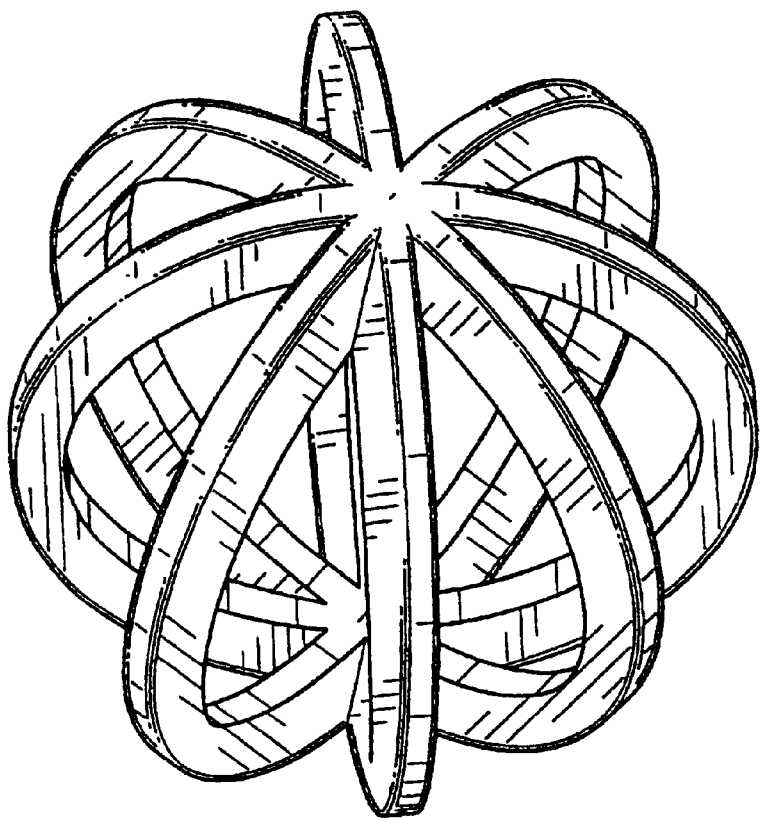
FIG. 8 is a perspective view of the third embodiment of the invention.

The third embodiment of the invention is shown in FIGS. 6, 7, and 8. The third embodiment of the invention differs from the first embodiment of the invention in that, instead of two intersecting tori being present, four intersecting tori are present, with each intersecting torus being aligned at an angle of forty-five degrees to the adjacent torus. Since all intersecting tori are of equal diameter, the intersecting tori can be inscribed on the surface of a sphere of equal diameter, similarly to the first embodiment of the invention. However, since there are four intersecting tori instead of two as in the first embodiment, the proportion of the surface area of the sphere occupied by the spaces between the tori is smaller than that in the first embodiment. The smaller proportion of surface area occupied by spaces between adjacent tori allows improved rolling ability over the rolling ability present with the first embodiment of the invention.

Figure 9:
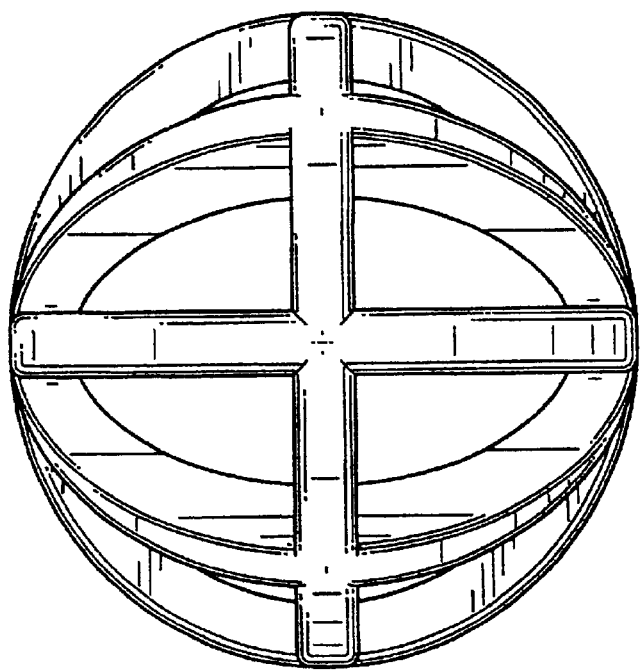
FIG. 9 is an elevation view of the fourth embodiment of the invention rotated by 90° counterclockwise.
Figure 10:
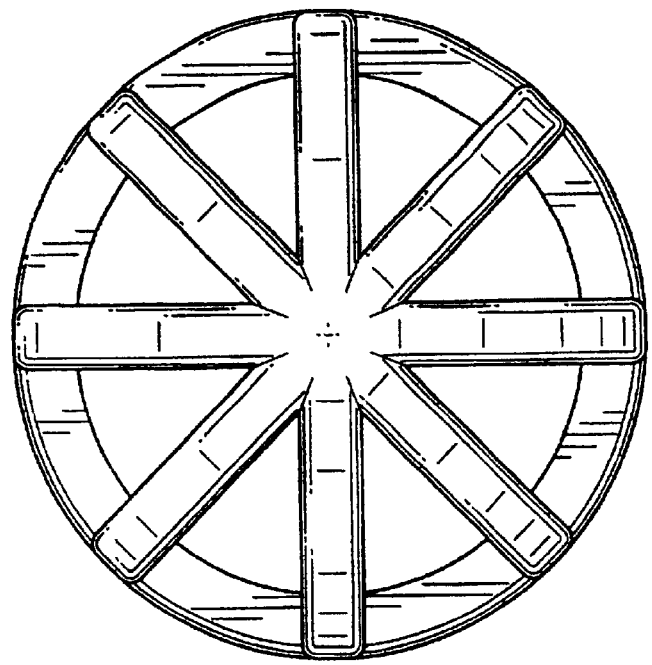
FIG. 10 is a plan view of the fourth embodiment of the invention.
Figure 11:
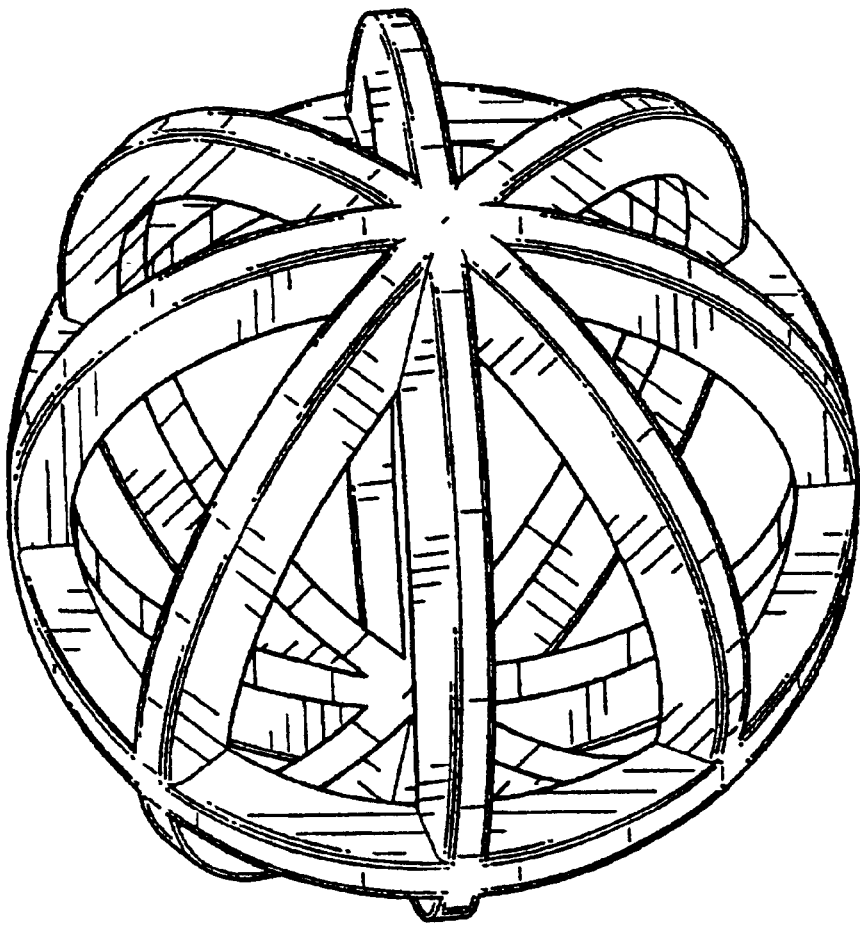
FIG. 11 is a perspective view of the fourth embodiment of the invention.
Figure 12:
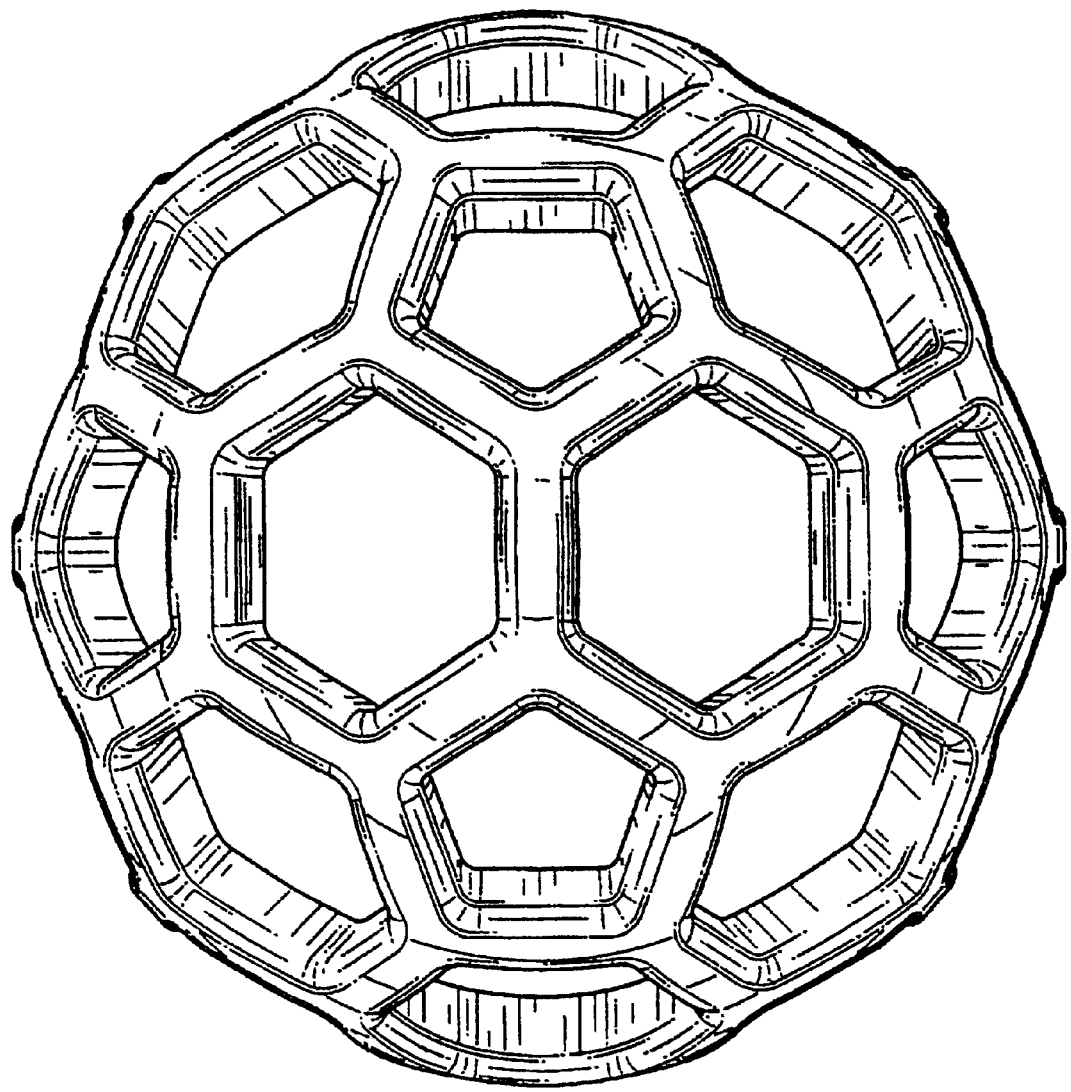
FIG. 12 is a front elevation view of the fifth embodiment of the invention.
Figure 13:
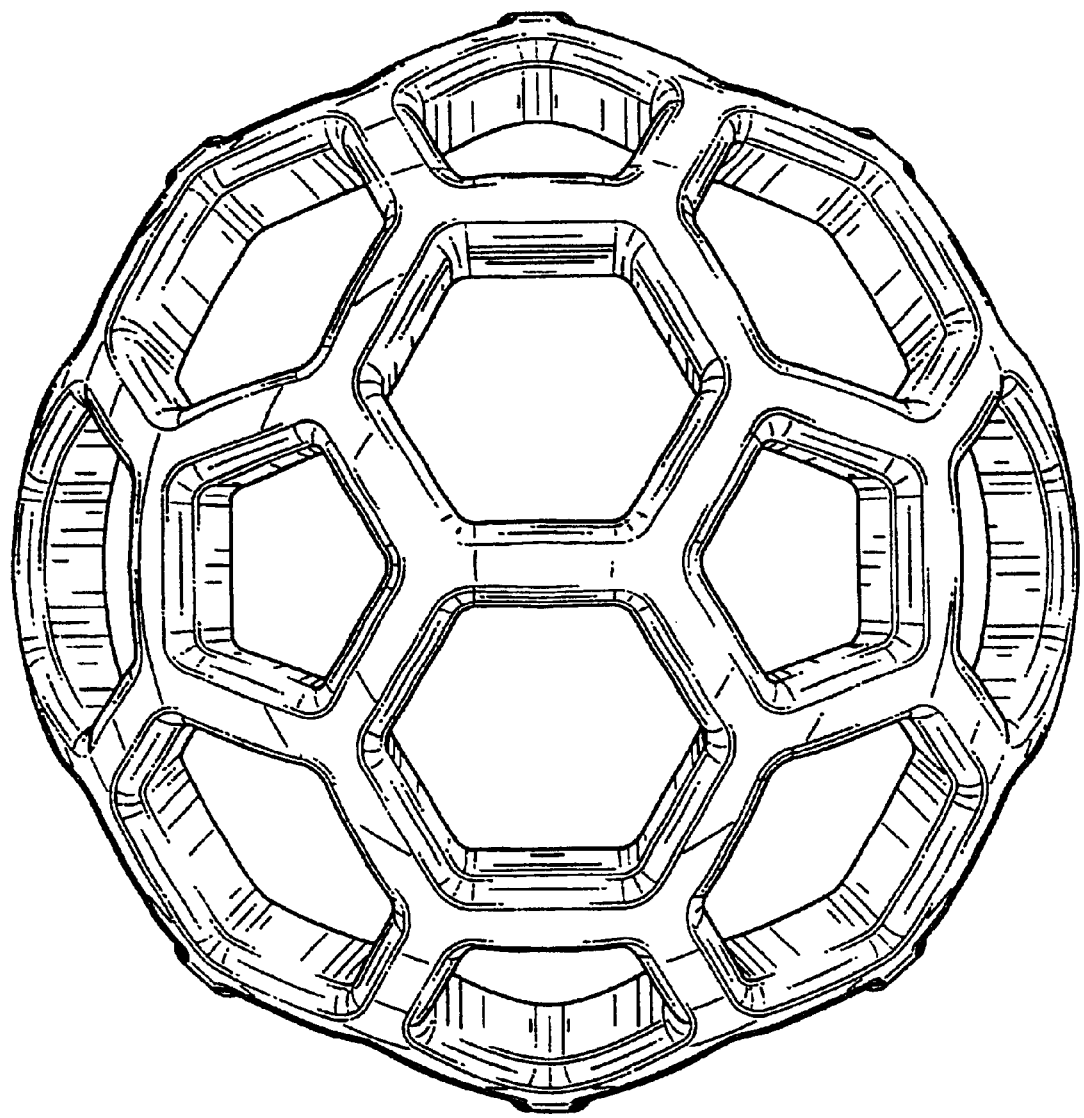
FIG. 13 is a side elevation view of the fifth embodiment of the invention.
Figure 14:
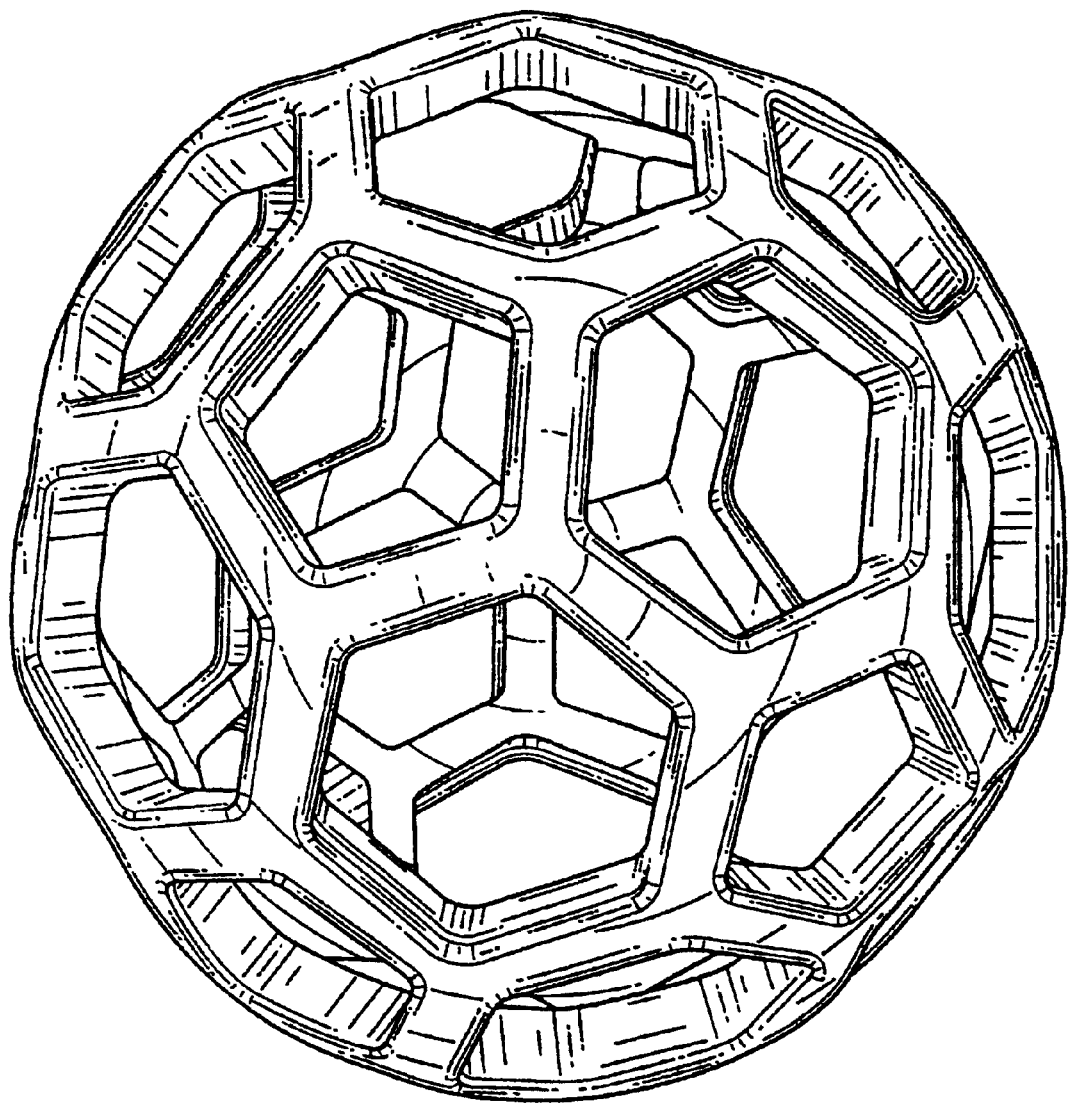
FIG. 14 is a perspective view of the fifth embodiment of the invention.

FIGS. 9, 10, and 11 show a fourth embodiment of the invention. The fourth embodiment of the invention differs from the third embodiment of the invention in that an additional torus is added to the four tori at the middle of the diameter of the four tori and in a plane perpendicular to the plane of each of the four tori. The addition of the fifth torus in the fourth embodiment of the invention, when compared to the third embodiment of the invention, allows the fourth embodiment of the invention to roll with greater ease than the third embodiment of the invention.

FIGS. 12–15 show a fifth embodiment of the invention. This embodiment of the invention comprises an elastomeric material formed in a skeletal structure of unitary construction to approximate the vertices and edges of a truncated icosahedron which is representative of the chemical structure for a recently discovered form of carbon molecule known as Buckministerfullerine or a "buckyball" for short. It can be seen from FIGS. 12–14 that the holes in the skeletal structure comprise both hexagons and pentagons.

Figure 15:
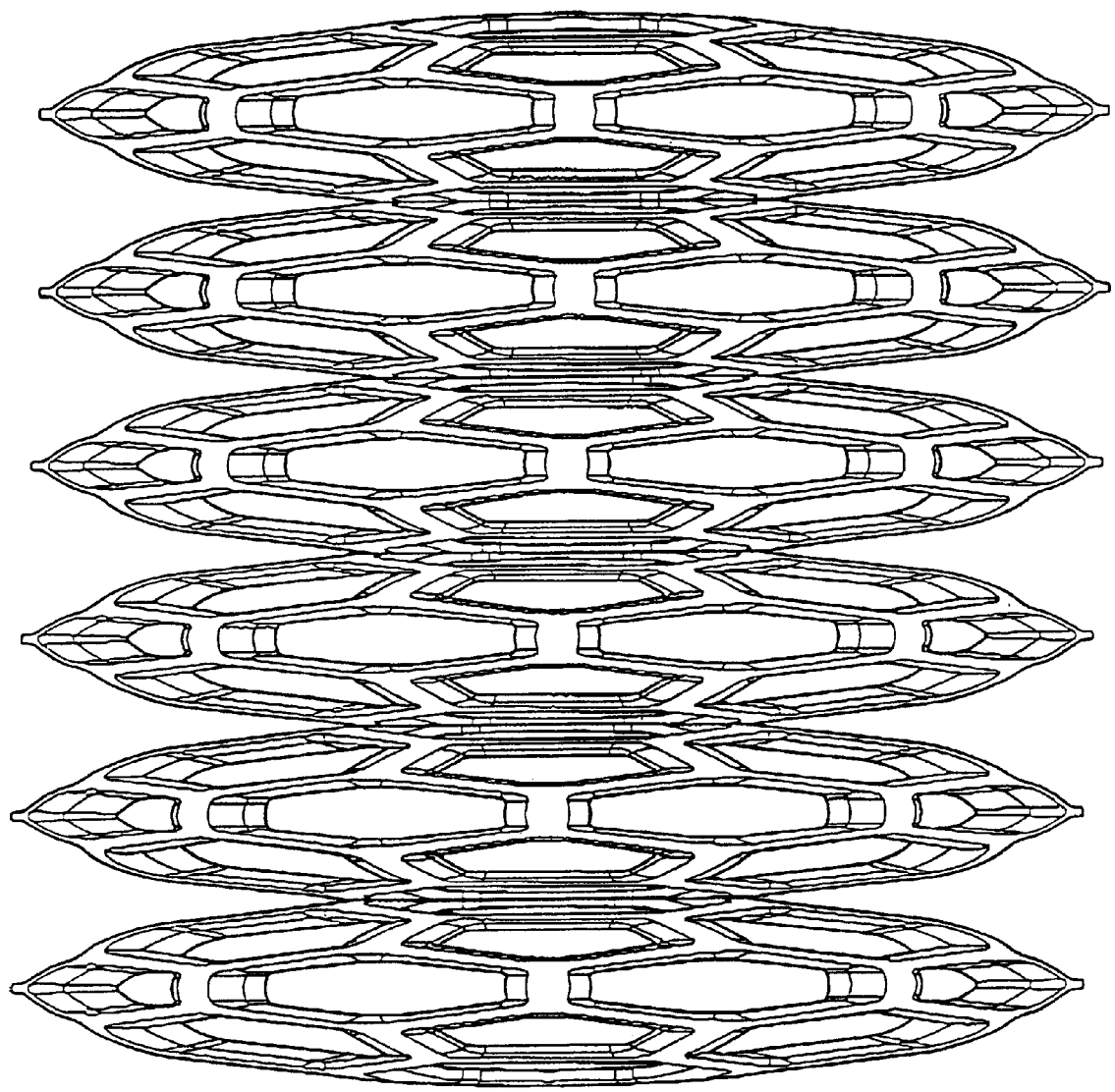
FIG. 15 is an elevation view of a plurality of specimens of the fifth embodiment of the invention stacked and compressed together for shipping.
Figure 16:
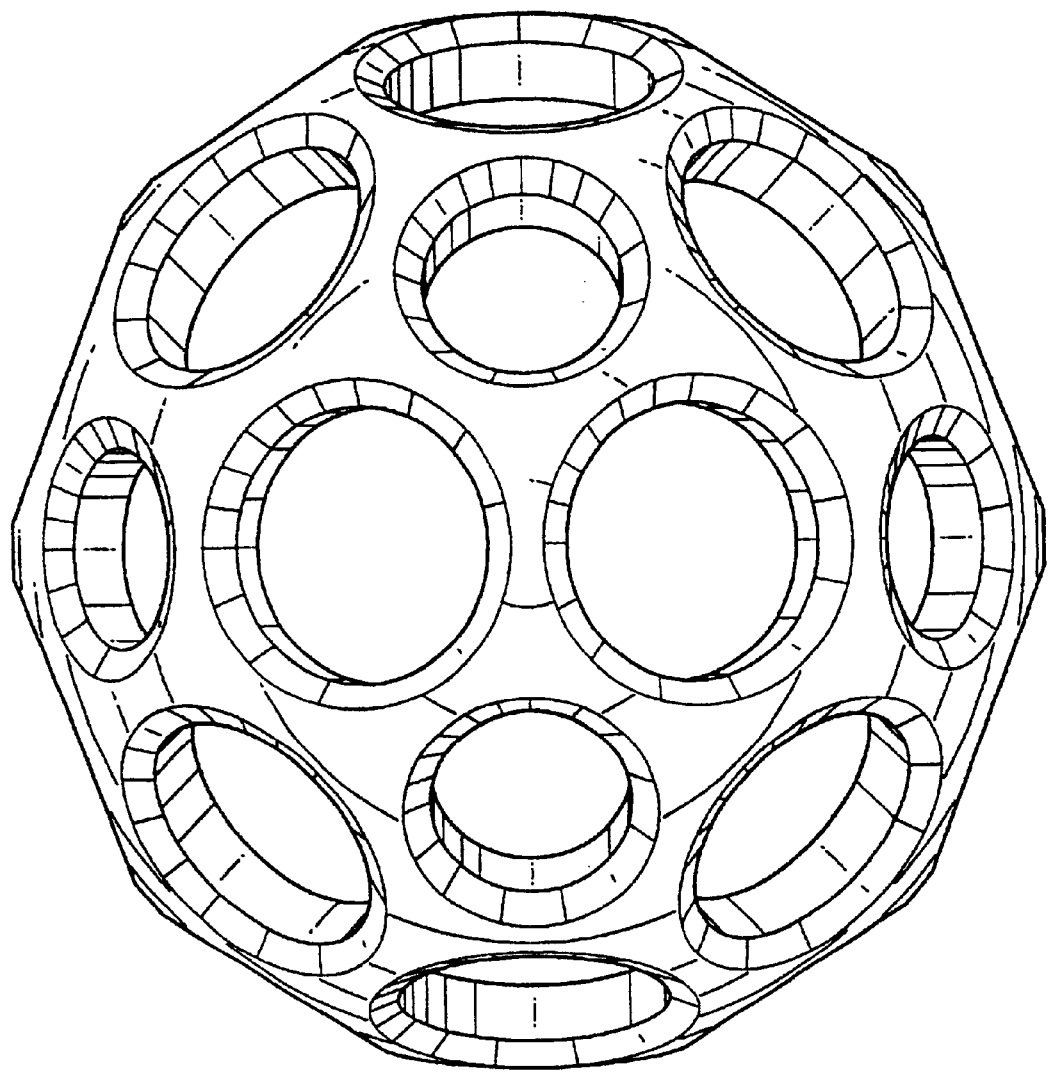
FIG. 16 is a front elevation view of the sixth embodiment of the invention.
Figure 17:
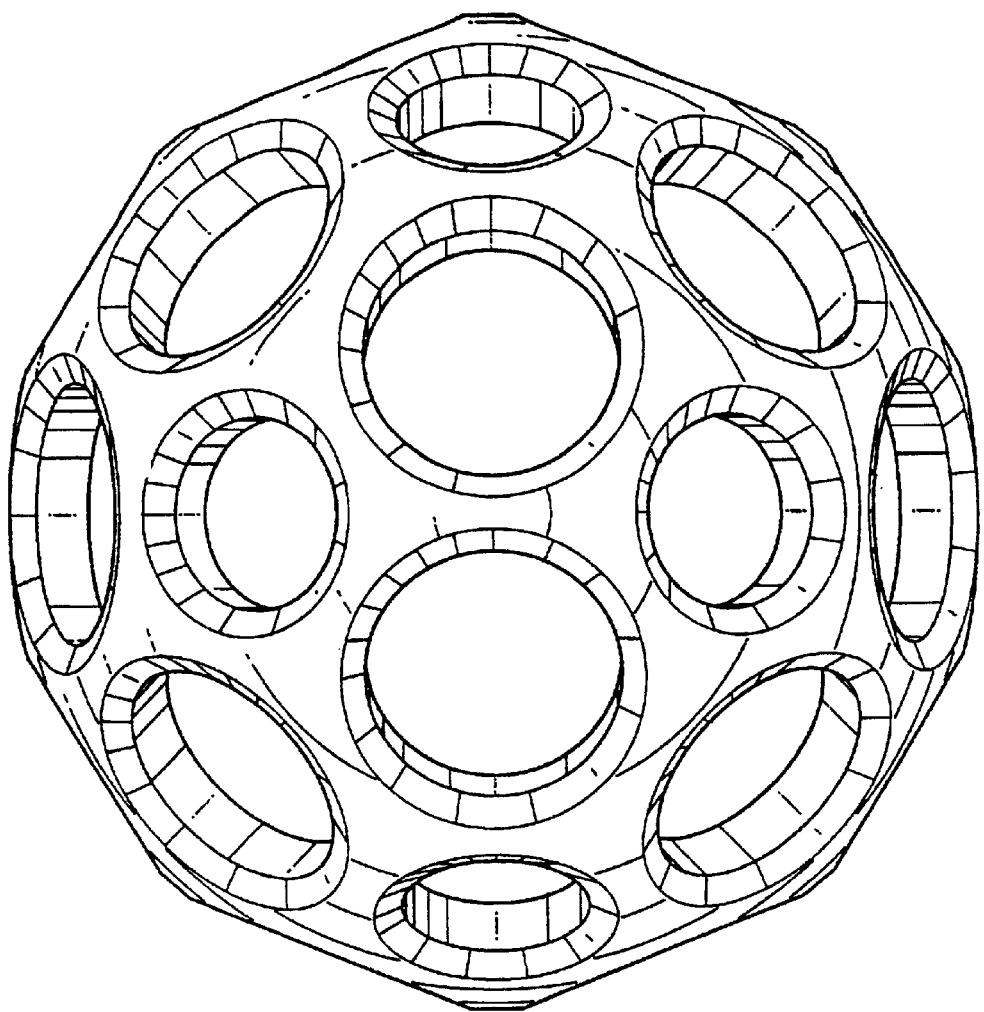
FIG. 17 is a side elevation view of the sixth embodiment of the invention.
Figure 18:
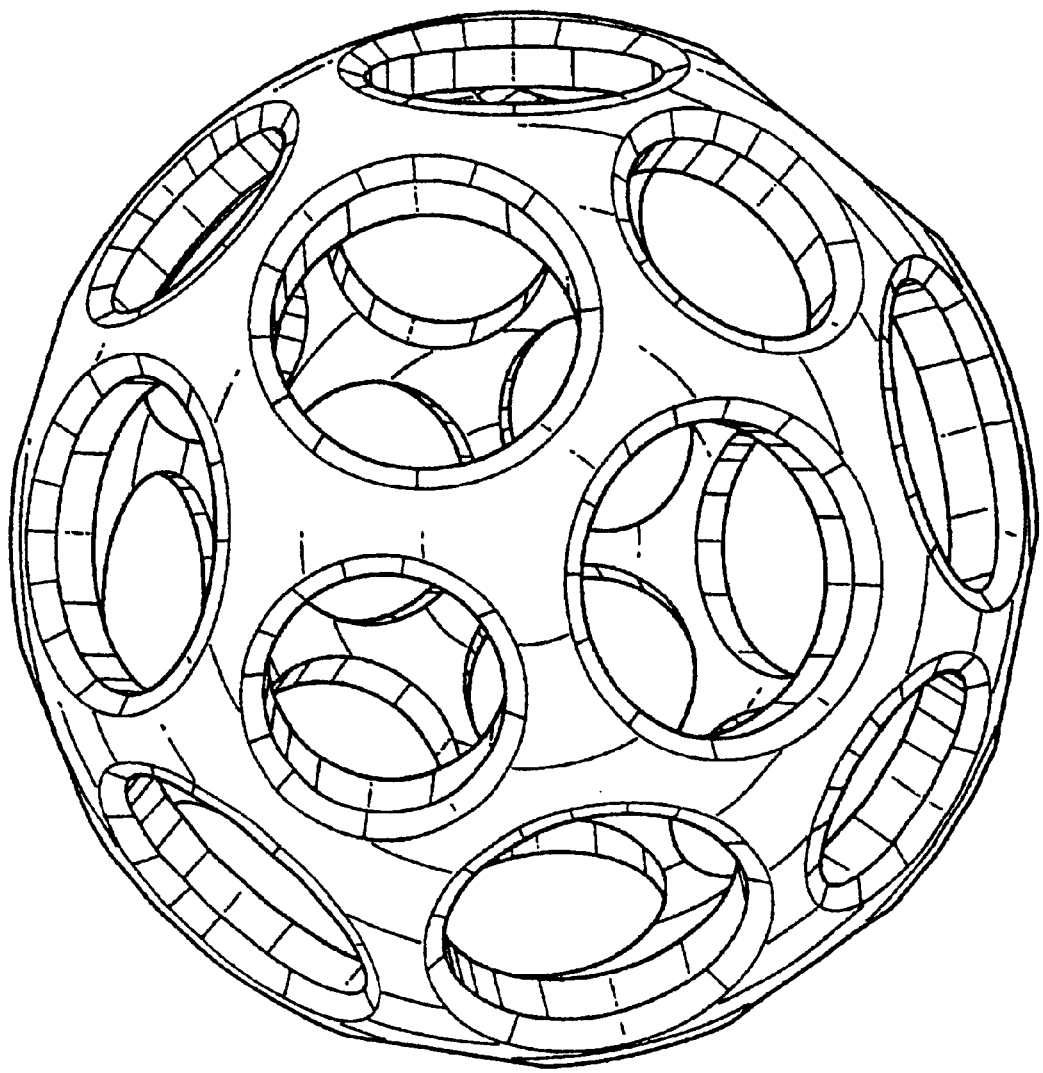
FIG. 18 is a perspective view of the sixth embodiment of the invention.

FIG. 15 shows the configuration of several animal toys compressed together for shipping. Since the invention is made of elastomeric rubber, such compression for shipping is fully possible and quite desirable from the standpoint of economy and efficiency. The skeletal structure of the fifth embodiment of the invention in the form of Buckminister-fullerine is merely one polyhedron that can be used as a skeletal structure to form the animal toy of the invention.

Other polyhedral surfaces, the vertices of which can be inscribed on a spherical surface, would also be possible candidates to supply the vertices and edges of a skeletal structure for the inventive animal toy. Incidentally, a polyhedral surface is defined as the surface bounding a three dimensional object where such surface is bounded by polygons, each edge of the polyhedral surface being shared by exactly two polygons. However, practically speaking, a polyhedron such as a tetrahedron bounded by four equal equilateral triangles, a hexahedron or cube bounded by six squares and an octahedron bounded by eight equilateral triangles would not be as preferable as some of the other embodiment configurations. For such polyhedra, their ability to roll would be compromised by their relatively non-spherical shape characterized by the distance between their respective faces and the spherical surface on which the vertices of those faces can be inscribed. The dodecahedron, having twelve regular pentagons as faces, and the icosahedron, having twenty equilateral triangles as faces, would be more acceptable polyhedral surfaces to provide vertices and edges for the skeletal structure of the current invention. A polyhedron with more than twenty faces whose vertices can be inscribed on the surface of a sphere would be even more preferable since, as the number of faces of the polyhedron increases, the faces will more closely approximate the spherical surface on which the vertices of the polyhedron can be inscribed. Of course, if the vertices of the polyhedron lie on the surface of an ellipsoid given by the equation:

$$\frac{x^2}{a^2} + \frac{y^2}{b^2} + \frac{z^2}{c^2} = 1$$

where "a", "b", and "c" are approximately equal to 1, the rolling capacity of the skeletal structure should not be significantly adversely affected.

A collection of numerous polyhedra can be found on the internet at www.georgehart.com/virtual-polyhedra/vp.html. In addition, a website entitled "The Pavilion of Polyhedreality" contains a listing and links to other websites related to polyhedra. The Pavilion of Polyhedreality may be found at www.georgehart.com/pavilion.html.

The sixth embodiment of the invention is shown in FIGS. 16–19. It differs from the fifth embodiment of the invention, in that, although the outer surfaces of the unitary skeletal structure are faces of a polyhedral surface, instead of the holes cut in the skeletal structure being in the shape of the faces themselves, circular holes are cut in each face instead.

Figure 19:
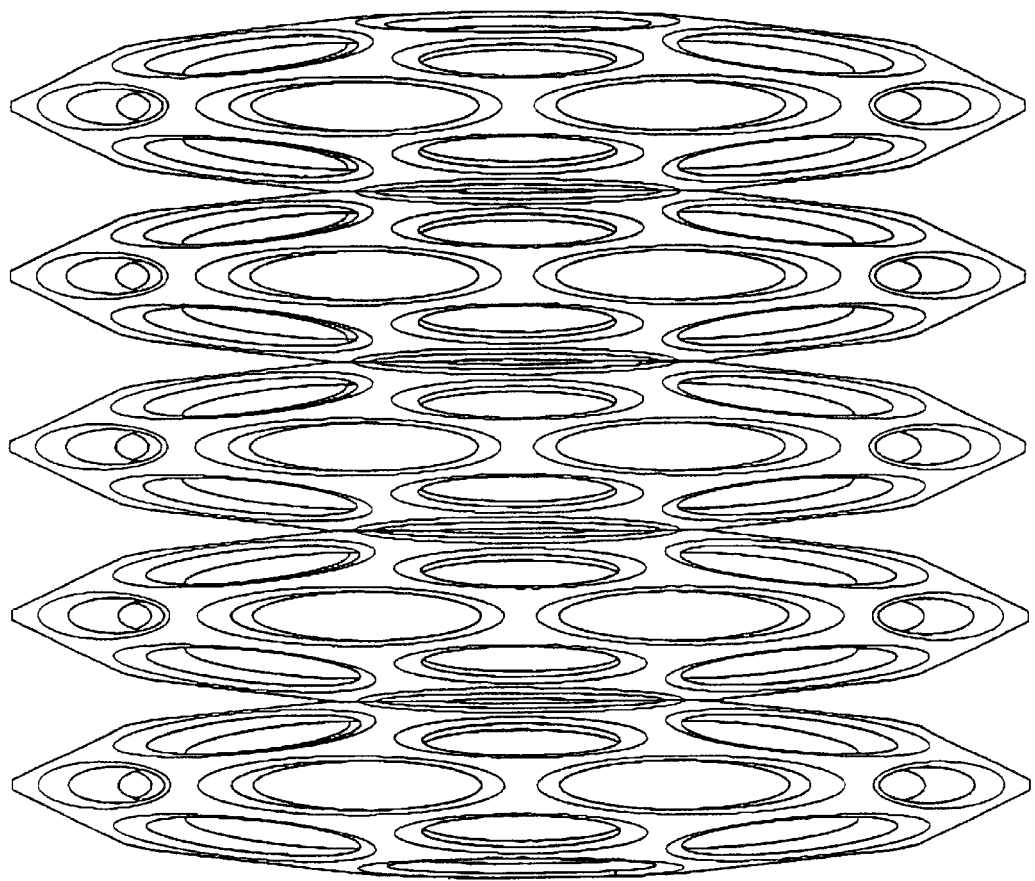
FIG. 19 is an elevation view of a plurality of specimens of the sixth embodiment of the invention stacked and compressed together for shipping purposes.

FIG. 19 shows a series of skeletal structures of the sixth embodiment of the invention compressed for shipping, similar to FIG. 15. Of course, other shapes of infinite variety may be cut as holes in the polyhedral faces of the skeletal structure besides circular holes as shown in FIG. 19.

Figure 20:
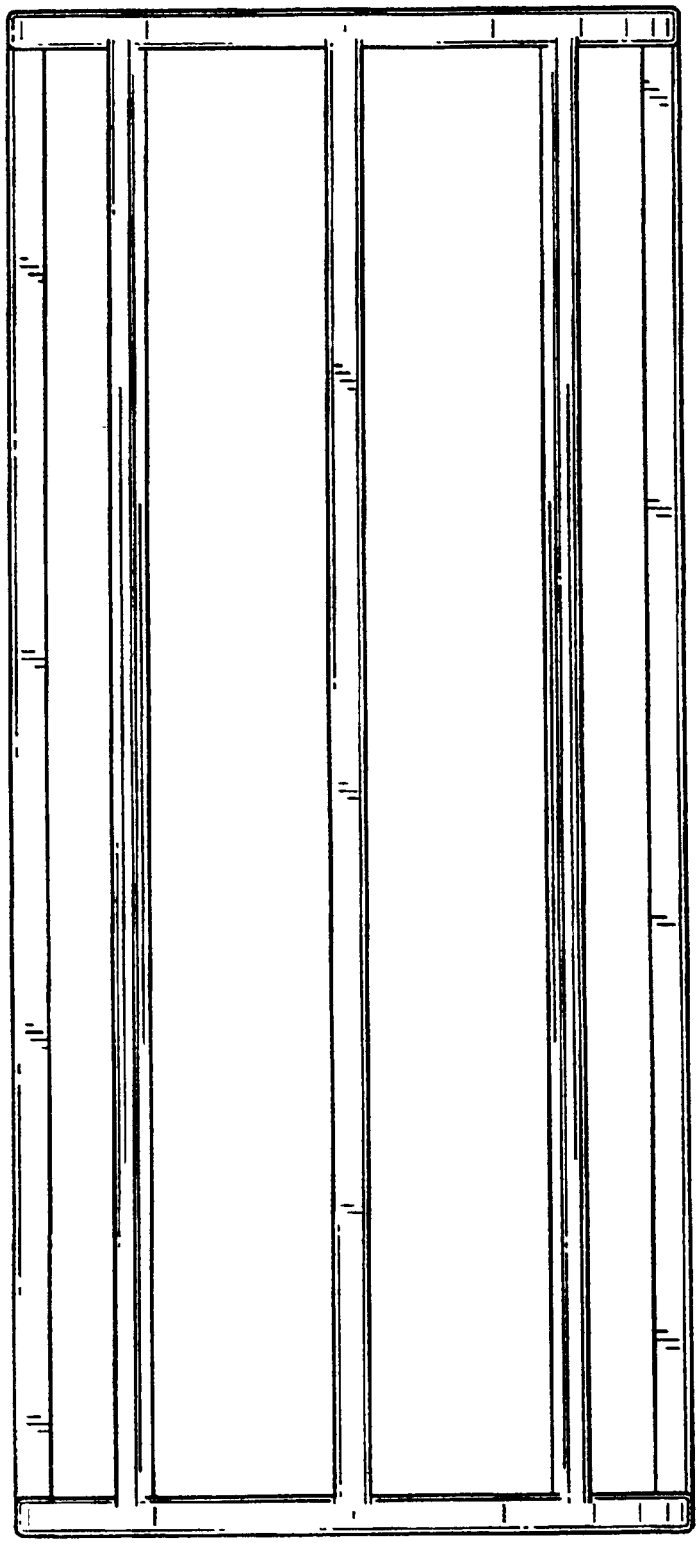
FIG. 20 is an elevation view of a seventh embodiment of the invention.
Figure 21:
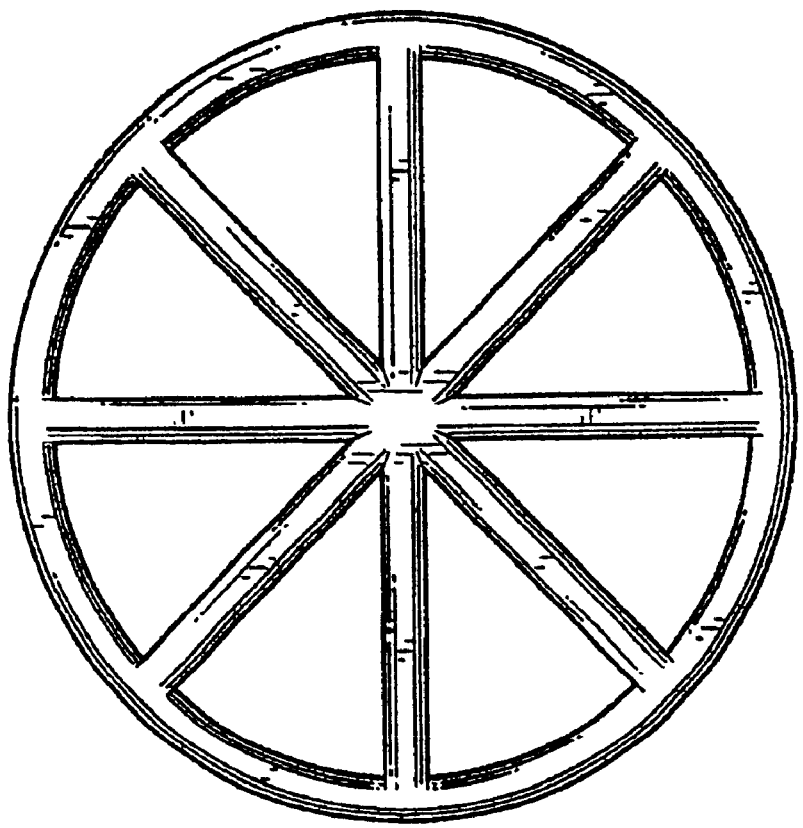
FIG. 21 is a side view of the seventh embodiment of the invention.
Figure 22:
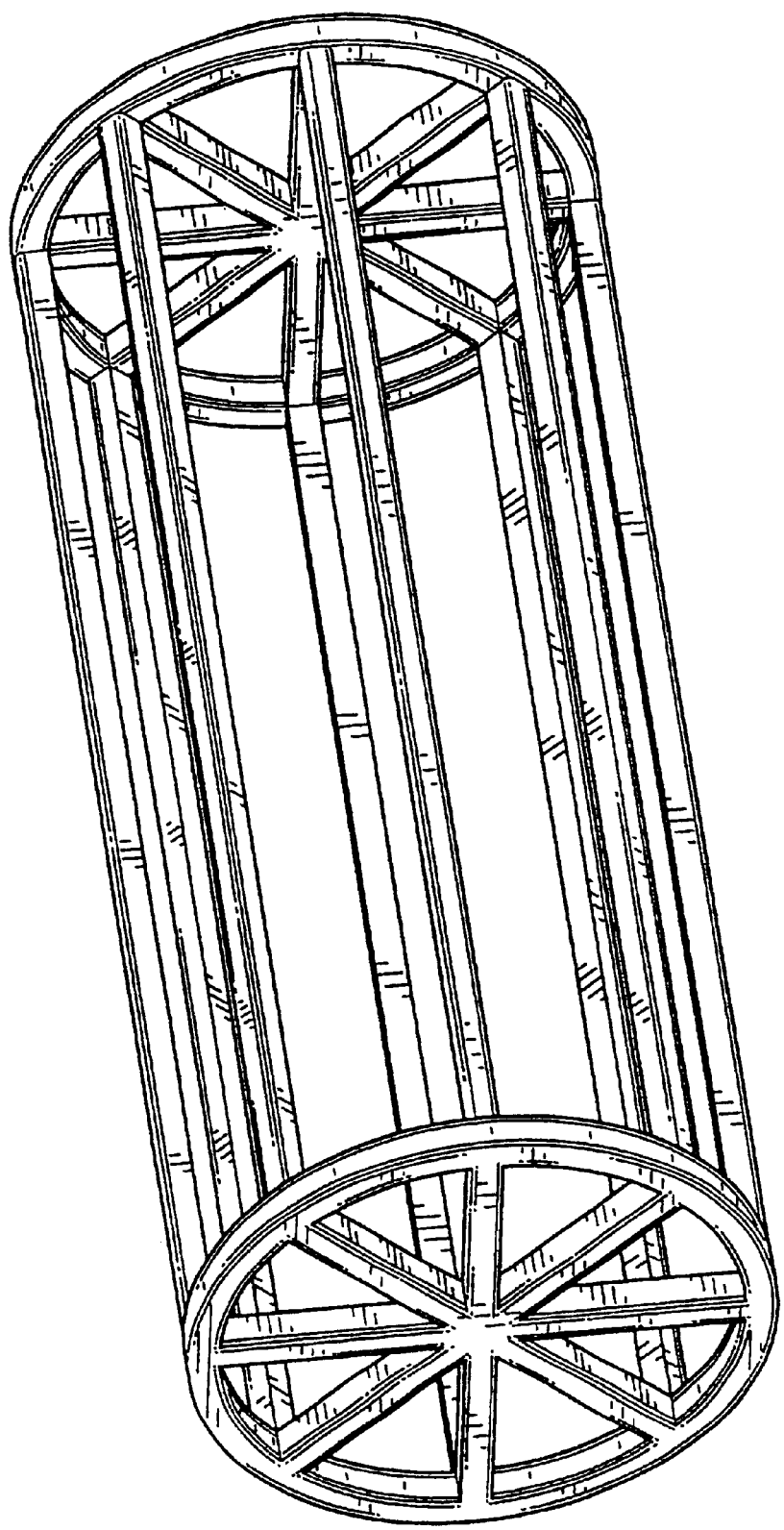
FIG. 22 is a perspective view of the seventh embodiment of the invention.

FIGS. 20–22 show a seventh embodiment of the invention. These drawings show a cylindrical skeletal structure for the animal toy with the two ends of the cylinder being closed by a spoke arrangement of such skeletal structure. Although a cylinder typically has a circular cross-section, a cylinder with an elliptical cross-section may also be considered provided that the eccentricity of the ellipse is kept low enough so that the shape of the ellipse does not interfere with the ease of rolling the skeletal cylindrical structure.

With reference to each of the figures, which are only representative of the acceptable shapes of the skeletal structure of the invention, it is evident that the material composition and geometric configuration of the skeletal structure of the present invention play a significant role in the ability of the mold to be extracted through the one-piece, unitary structure. For instance, the holes in all of the skeletal structures of the present invention must be large enough so that the internal molds on which they are formed can be extracted from the one-piece skeletal structure after forming. In addition, the holes should be large enough so that an animal can grasp the skeletal structure easily with its teeth. The holes, however, should not be so large that they are within faces large enough to significantly flatten the skeletal structure and thus interfere with the ease of bouncing or rolling the skeletal structure.

For example, samples of the fifth embodiment of the invention in the buckyball configuration have been produced. For a sample of approximate diameter of 4⅝ inches, a maximum dimension of the holes was approximately 1½ inches and a minimum dimension of the holes was approximately ¾ of an inch. A second sample in the buckyball configuration of approximately 5½ inches in diameter was also produced. For that second sample, the maximum dimension of the holes was approximately 1¼ inches, while the minimum dimension of the holes was approximately ¾ of an inch. Finally, a sample in the buckyball configuration of approximately 7⅛ inch diameter was produced. For that sample, a maximum dimension of the holes of approximately 2½ inches was measured, while a minimum dimension of the holes of approximately 1⅛ inches was measured. In general, dimensions of the holes for the buckyballs should be in the range from ⅜ of an inch to 4 inches and the range of diameters for the buckyballs should be 3 to 14 inches.

As noted above, in addition to the geometric configuration, the material composition of the skeletal structure of the present invention plays a significant role in the manufacturing of the unitary construction. The preferred material for the animal toy of the present invention is natural rubber since that elastomeric material, in addition to its capability of bouncing which synthetic elastomeric materials also possess, allows the extraction of an internal mold through one of the holes of the one-piece skeletal structure when the skeletal structure has just been formed and is still in a heated state. Synthetic elastomeric materials may not allow an internal mold to be extracted from a skeletal structure formed of such synthetic elastomeric materials when such skeletal structure is still in a heated state, which may require the formation of the skeletal structure from more than one piece or more than one manufacturing stage. Furthermore, natural rubber has superior tear resistance to synthetic elastomers, which is important in an animal toy where the animal can be expected to grasp the toy with its teeth. The material of the animal toy, in general, has the following composition: 90% natural rubber, 2% calcium carbonate, 1% sulfur, 5% accelerator combination and 2% zinc oxide.

Natural rubber, known chemically as cis-polyisoprene, is from a plant source most often from the tree Hevea Brasiliensis. However, rubber is also available from chemical synthesis and is then known as synthetic natural rubber and is known chemically as polyisoprene. With regard to the important properties of cold tear resistance to resist tearing by an animal's teeth, hot tear resistance to allow extraction of a mold, and resilience necessary for this animal toy, synthetic natural rubber is the equivalent of natural rubber. In addition, although the composition of the animal toy given above has 90% natural rubber, it is not necessary for 90% of the animal toy to be natural rubber. Natural rubber or synthetic natural rubber can be blended with other polymers and still make possible the necessary properties of the animal toy. However, the natural rubber or synthetic rubber in such a blend would still have to be more than 50% of the polymer in the compound. Thus, assuming a normal 90% natural rubber composition of the animal toy, natural rubber would have to be more than 45% of the animal toy with another less than 45% of the animal toy being another polymer blended with natural rubber or synthetic natural rubber. Such blending polymers include butadiene rubber, styrene-butadiene rubber, nitrile rubber, ethylene-propylene-diene-monomer (EPDM) rubber or other sulfur vulcanizable elastomeric polymers that would be known to one of ordinary skill in the art.

The calcium carbonate in the above composition, which is most often ground limestone, and is also known as Whiting, is used to make the rubber product opaque instead of translucent or mottled in hue. More expensive substitutes for calcium carbonate include various types of clay or talc such as diatomaceous earth, aluminum silicate, also known as clay, magnesium aluminum silicate, and magnesium carbonate.

Sulfur in the above composition acts to form chemical crosslinks in the natural rubber or synthetic natural rubber in a process known as vulcanization. Peroxides could also be used to vulcanize the natural rubber or synthetic natural rubber, but then the properties of hot and cold tear resistance and resilience would not be as good as those obtained with a sulfur based vulcanization process.

The zinc oxide in the above composition catalyzes the vulcanization reaction. Substitutes for zinc oxide are cadmium oxide and lead oxide, but they are more costly than zinc oxide and are also considered hazardous. An additional catalyst is often used in combination with the zinc oxide, the additional catalyst being a fatty acid, stearic acid being the most often used fatty acid. Instead of the combination of the zinc oxide and the fatty acid, a zinc salt, such as zinc stearate, may be used as a catalyst also.

The accelerator combination is a group of chemicals, which increase the speed of the vulcanization process of the rubber. The principal types of accelerators are derivatives of Schiff's bases; and include the following families of compounds: guanidines, thiazoles, sulfenamides, thiocarbamates, thiurams, zimates, and morpholines. One of ordinary skill in the art would be aware of the particular subvarieties within each family and how to combine them.

Finally, if any one of butadiene rubber, neoprene, known chemically as polychloroprene, or EPDM rubber is reinforced with carbon black and used instead of synthetic natural rubber or natural rubber, the resulting animal toys will have hot and cold tear resistance and resilience approaching that available with either natural rubber or synthetic natural rubber. However, all such animal toys will be black due to the presence of carbon black, as contrasted to animal toys using natural rubber or synthetic natural rubber or other gum compounds including natural rubber or synthetic natural rubber and including no carbon black, which can be dyed to any desired color.

The animals contemplated to use this toy the most are dogs, although cats and other pets attracted to rolling objects may also be amused by it. Furthermore, while pets are the anticipated end-users, children and adults alike are also contemplated to enjoy playing with the toy. For small children, the material properties that make the inventive toy safe for grabbing and chewing would also apply equally for use by such children, as small children tend bite or chew anything that they handle. In addition, the compressibility of the toy of the invention upon the application of a forceful impact lends itself to be used in an aggressive setting, wherein such toy is not likely to cause harm to an individual if such individual is the unforeseen recipient of a mischievous throw. Thus, the skeletal toy of the present invention can have numerous applications beyond the pet field.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. For instance, while only certain shapes and skeletal configurations are illustrated in the figures, other shapes and configurations will be acceptable. Also, while the illustrated configurations have uniform skeletal structures and uniform opening arrangements, it will be understood that non-uniform skeletal structures and openings are possible, as long as such structures meet the objectives of the present invention.

What is claimed is:

1. A flexible toy having a one-piece, molded construction formed of an elastomeric material, comprising:
   a framework, and
   a plurality of openings provided in said framework,
   wherein said toy has sufficient material properties to allow an internal mold to be extracted through at least one opening of said plurality without tearing said framework during said extraction,
   wherein said toy is at least being capable of rolling and bouncing and wherein said framework is capable of being compressed for purposes of compact storage and shipping, and
   wherein said framework comprises two tori of equal diameter, said two tori being separated by a certain lateral distance, at least two linear members spanning said certain lateral distance, and at least one linear member for each of said two tori, said at least one linear member spanning said equal diameter of said each of said two tori.

2. A flexible toy having a one-piece, molded construction formed of an elastomeric material, comprising:
   a framework, and
   a plurality of openings provided in said framework,
   wherein said toy has sufficient material properties to allow an internal mold to be extracted through at least one opening of said plurality without tearing said framework during said extraction,
   wherein said toy is at least being capable of rolling and bouncing and wherein said framework is capable of being compressed for purposes of compact storage and shipping, and
   wherein said framework comprises two ellipses separated by a certain lateral distance, at least two linear members spanning said certain lateral distance, and at least one linear member for each of said two ellipses, said at least one linear member spanning said each of said two ellipses.

3. A method of making a flexible toy having a framework comprising the steps of:
   providing an internal mold,
   introducing an elastomeric material onto said internal mold,
   molding said elastomeric material into a shape that is representative of said framework, said shape having a plurality of openings, and extracting said internal mold through at least one opening of said plurality, wherein said elastomeric material has sufficient hot tear resistance to allow said internal mold to be extracted through said at least one opening of said framework without tearing said framework.

4. A method of making a flexible toy as claimed in claim 3, wherein said elastomeric material is natural rubber.

5. A method of making a flexible toy as claimed in claim 4, wherein said elastomeric material further includes calcium carbonate.

6. A method of making a flexible toy as claimed in claim 4, wherein said elastomeric material further includes sulfur.

7. A method of making a flexible toy as claimed in claim 6, wherein said elastomeric material further includes zinc oxide.

8. A method of making a flexible toy as claimed in claim 7, wherein said elastomeric material further includes a fatly acid.

9. A method of making a flexible toy as claimed in claim 6, wherein said elastomeric material further includes a zinc salt.

10. A method of making a flexible toy as claimed in claim 6, wherein said elastomeric material further includes an accelerator combination.

11. A method of making a flexible toy as claimed in claim 3, wherein said elastomeric material is synthetic rubber.

12. A method of making a flexible toy as claimed in claim 11, wherein said elastomeric material further includes calcium carbonate.

13. A method of making a flexible toy as claimed in claim 11, wherein said elastomeric material further includes sulfur.

14. A method of making a flexible toy as claimed in claim 13, wherein said elastomeric material further includes zinc oxide.

15. A method of making a flexible toy as claimed in claim 14, wherein said elastomeric material further includes a fatty acid.

16. A method of making a flexible toy as claimed in claim 13, wherein said elastomeric material further includes a zinc salt.

17. A method of making a flexible toy as claimed in claim 13, wherein said elastomeric material further includes an accelerator combination.

18. A method of making a flexible toy as claimed in claim 3, wherein said elastomeric material is a combination of natural rubber and one of a group of blending polymers consisting of butadiene rubber, styrene-butadiene rubber, nitrile rubber, and ethylene-propylene-diene-monomer rubber.

19. A method of making a flexible toy as claimed in claim 3, wherein said elastomeric material is a combination of synthetic rubber and one of a group of blending polymers consisting of butadiene rubber, styrene-butadiene rubber, nitrile rubber, and ethylene-piopylene-diene-monomer rubber.

20. A method of making a flexible toy as claimed in claim 3, wherein said elastomeric material is one of a group of polymers consisting of butadiene rubber, neoprene and ethylene-propylene-diene-monomer rubber, said polymer being reinforced with carbon black.

21. A method of making a flexible toy as claimed in claim 3, wherein said elastomeric material has sufficient hot tear resistance to allow said internal mold to be extracted through said at least one opening of said framework without tearing said framework.

22. A method of making a flexible toy as claimed in claim 3, wherein said framework comprises at least two tori of equal diameter.

23. A method of making a flexible toy as claimed in claim 3, wherein said frame-work comprises the approximate vertices and edges of a truncated icosabedron.

24. A method of making a flexible toy as claimed in claim 3, wherein said framework comprises two tori of equal diameter, said two tori being separated by a certain lateral distance, at least two linear members spanning said certain lateral distance, and at least one linear member for each of said two tori, said at least one linear member spanning said equal diameter of said each of said two tori.

25. A method of making a flexible toy as claimed in claim 3, wherein said framework comprises two ellipses separated by a certain lateral distance, at least two linear members spanning said certain lateral distance, and at least one linear member for each of said two ellipses, said at least one linear member spanning said each of said two ellipses.

26. A method of making a flexible toy as claimed in claim 3, wherein at least a portion of each member of said framework lies on an imaginary spherical surface.

27. A method of making a flexible toy as claimed in claim 3, wherein at least a portion of each member of said framework lies on an imaginary ellipsoidal surface.

28. A method of making a flexible toy as claimed in claim 3, wherein each of said plurality of openings has the same shape.

29. A method of making a flexible toy as claimed in claim 28, wherein the shape of said plurality of openings varies only in size around said framework.

30. A method of making a flexible toy as claimed in claim 3, wherein the shape of each of said plurality of openings varies in an alternating pattern around said framework.

* * * * *